United States Patent [19]

Peters et al.

[11] Patent Number: 5,790,756
[45] Date of Patent: Aug. 4, 1998

[54] ANALOG FUZZY LOGIC CONTROLLER FOR POSTERIOR ALTERATION OF FUZZY RULES

[75] Inventors: Liliane Peters; Klaus Beck, both of Bonn; Shuwei Guo, Siegburg, all of Germany

[73] Assignee: GMD-Forschungszentrum Informationstechnik GmbH, Sankt Augustin, Germany

[21] Appl. No.: 737,728

[22] PCT Filed: Dec. 28, 1994

[86] PCT No.: PCT/EP94/04331

§ 371 Date: Sep. 10, 1996

§ 102(e) Date: Sep. 10, 1996

[87] PCT Pub. No.: WO95/26528

PCT Pub. Date: Oct. 5, 1995

[30] Foreign Application Priority Data

Mar. 29, 1994 [DE] Germany ............... 44 10 834.6

[51] Int. Cl.$^6$ ............................................. G06G 7/00
[52] U.S. Cl. ...................................... 395/3; 395/61
[58] Field of Search ............................. 395/3, 61, 900

[56] References Cited

U.S. PATENT DOCUMENTS

| | | | |
|---|---|---|---|
| 5,245,695 | 9/1993 | Basehore | 395/3 |
| 5,371,832 | 12/1994 | Eichfeld et al. | 395/3 |
| 5,515,476 | 5/1996 | Nishidai et al. | 395/3 |
| 5,561,739 | 10/1996 | Muraji | 395/3 |

FOREIGN PATENT DOCUMENTS

| 0 361 403 | 4/1990 | European Pat. Off. | G06F 7/60 |
|---|---|---|---|

OTHER PUBLICATIONS (Leme et. al, Programmable CMOS Analog Function Synthesis, IEEE ISCS, vol. 2, pp. 1397–1400), May 1993.

(Tsukano et. al, A Design of Current–Mode Analog Circuits for Fuzzy Inference Hardware Systems, IEEE, vol. 2, pp. 1385–1388), May 1993.

*Primary Examiner*—Allen R. MacDonald
*Assistant Examiner*—Keith B. White
*Attorney, Agent, or Firm*—Akin, Gump, Strauss, Hauer & Feld LLP

[57] ABSTRACT

The analog fuzzy logic controller includes a fuzzification circuit by which the position and the shape of the membership functions associated with the linguistic input variables may be adjusted in an analog manner from outside. The output signals corresponding to the fuzzy values of the fuzzification circuit are supplied to an inference circuit. The output of the inference circuit is provided with a plurality of analog multiplex circuits with which the association of a degree of membership of a fuzzy rule to one or a plurality of linguistic output variables may be influenced. The defuzzification circuit of the fuzzy controller, which receives the output signals from the inference circuit, then calculates the output signals of the fuzzy controller according to the center of gravity method.

12 Claims, 8 Drawing Sheets

ANALOG FUZZY LOGIC CONTROLLER FOR POSTERIOR ALTERATION OF FUZZY RULES

The present invention refers to an analog fuzzy logic controller with a fuzzification circuit, an inference circuit and a defuzzification circuit, as known from EP 0 489 913 A1.

To an increasing extent, controllers based on fuzzy logic are used for controlling purposes. It is the basic idea of fuzzy logic to assign an input value or an input signal to one of a plurality of linguistic input variables and to determine the degree to which the input signal belongs to one or a plurality of linguistic variables. Depending on the degree to which one or a plurality of input signals belongs to, generally, a plurality of different linguistic variables, control operations of the system to be controlled are triggered. The range within which the input signal or value may vary is divided into a plurality of linguistic variables. If, for example, a control depending on the room temperature is to be made within a range from 0° C. to 50° C., this temperature range could be subdivided into the three linguistic variables "low", "medium" and "high", where the temperature range from 0° C. to 25° C. is assigned to the linguistic variable "low", while the temperature range from 20° C. to 40° C. is assigned to the linguistic variable "medium" and the temperature range from 25° C. to 50° C. is assigned to the linguistic variable "high". Each linguistic variable is associated with a membership function referred to as a semantic rule of the linguistic variable and describing the membership degree of an input signal, in this case a temperature input signal, to the respective linguistic variable. These membership functions are generally trapezoidal or triangular functions realized in a relatively simple manner by analog or digital circuits exhibiting such transfer behavior. It is more advantageous for the fuzzy logic control, however, if the respective membership functions are bell-shaped, since then the relation between the deviation of an input signal from the maximum and the degree of membership of the input signal to the linguistic variable would not be linear and, thus, weighted.

Bell-shaped and trapezoidal, as well as triangular membership functions for fuzzy controls are described, for example, in "Clevere Regler schnell entworfen", Prof. Dr. Ing. Karl Goser, Dipl.-Inf. Hartmut Surmann, Elektronik 6/1992, pages 60 to 68. It is generally known from EP 0 489 913 A1 to realize the membership functions in a fuzzy controller by analog circuits. Moreover, generating z- and s-shaped transfer functions by means of differential amplifier circuits is known from DE 42 43 506 C1.

Generally, 30 to 300 (syntactic) rules are realized in a fuzzy logic controller, depending on the complexity of the control. At least two linguistic variables, i.e. two membership functions, are required for each rule, if one assumes that each rule has an input and an output signal associated therewith. For, e.g., 300 realized rules in a fuzzy logic controller, it is not uncommon that up to 1000 membership functions must be realized by circuitry. Up to the present day, bell-shaped membership functions assigned to the linguistic variables have been realized in circuitry by linearizing the membership function portion by portion using triangular or trapezoidal functions and realizing the individual linear portions by circuitry afterwards. In contrast to the bell-shaped function, where membership degrees other than zero correspond to a wide range of input signals, a triangular or trapezoidal function that is to simulate the bell-shaped function has a comparatively narrow range in which the membership degree is different from zero. Therefore, the value range within which the input signal(s) can fall must be covered by more linguistic variables than is the case for bell-shaped semantic rules, where each linguistic variable is described by a bell-shaped function. This increases the complexity of the controller. Since more of such functions have to be realized by circuitry for triangular or trapezoidal membership functions than for bell-shaped membership functions, more space or a rather large chip area, seen in relation to the realized complexity of control, is required if the controller is constructed in integrated technology.

A certain disadvantage of known analog fuzzy controllers is that only a limited posterior configuration of the fuzzy controller can be obtained. For example, it is not possible with conventional analog fuzzy controllers to influence the shape of the membership functions and their positions within the allowable input value range of the input signal. Furthermore, a posterior alteration of the fuzzy rules can neither be performed.

It is the object of the present invention to provide an analog fuzzy controller that may be configured such that a posterior change of the form of the fuzzy rules, as well as the rules themselves can easily be made.

In order to solve this object, the invention suggests an analog fuzzy controller comprising:

a fuzzification circuit for converting at least one analog input signal to at least one analog output signal describing the degree of membership of the input signal to at least one linguistic input variable and representing a fuzzy value, an inference circuit for processing the at least one analog output signal according to predetermined fuzzy rules and for outputting at least one analog output signal representing the degree of membership of the processed output signal of the fuzzification circuit to at least one linguistic output variable, and a defuzzification circuit for converting the at least one output signal of the inference circuit to at least one overall output signal that corresponds to the degree of membership of the output signal of the inference circuit to the at least one linguistic output variable.

According to the invention, the fuzzification circuit of the analog fuzzy controller comprises:

a plurality of first voltage generating devices with mutually off set first transfer functions, wherein the input signals may be applied to the inputs of the first voltage generating devices and wherein, within different voltage value ranges of the input signal, the first voltage generating devices generate a first output signal at their outputs that de creases with the increase of the input signal, a plurality of second voltage generating devices with mutually offset second transfer functions, wherein the input signals may be applied to the inputs of the second voltage generating devices and wherein, within different voltage value ranges of the input signal, the second voltage generating devices generate a second output signal at their outputs that increase s with the increase of the input signal, a first superposing circuit for superposing the output signals of a plurality of selectable first voltage generating devices or for connecting through the output signal of a selectable first voltage generating device, the inputs or the input of the first superposing circuit being connected to the outputs of the selected first voltage generating devices or the output of the selected first voltage generating device, and wherein the superposing signal of the output signals of the selected first voltage generating devices or of the output signal of the selected first voltage generating device is present at the output of the first superposing circuit, a second superposing circuit for superposing the output signals of a plurality of selectable second voltage generating devices or for connecting through the output signal of a selectable second voltage generating device, the inputs or the in put of the second superposing circuit being connected to the outputs of the selected second voltage generating devices or the output of the selected second voltage generating device, and wherein the superposing signal of the output signals of the selected second voltage generating devices or of the output signal of the selected second voltage generating device is present at the output of the second superposing circuit, and a filter circuit (usually a maximum output circuit) connected with both outputs of the first and second superposing circuits, which are associated with a linguistic variable, for connecting through the greater or the smaller one of the output signals of the two superposing circuits, the output signals of the filter circuit corresponding to the fuzzy value for the input signal present at the first and second voltage generating devices.

The fuzzification circuit of the present analog fuzzy controller comprises a plurality of first voltage generating devices and a plurality of second voltage generating devices. The first voltage generating devices are characterized by first transfer functions, whereas the second voltage generating devices are characterized by second transfer functions. All first transfer functions offset with respect to each other, i.e., in an X-Y diagram with the input voltage on the x axis and the output voltage of the first voltage generating devices on the y axis, the first transfer functions are offset in the direction X by certain voltage differences. Preferably, the voltage differences between adjacent first transfer functions are of equal magnitude. The above is also true for the second voltage generating devices and their second transfer functions. In particular, the first and second transfer functions, respectively, have the shape of the two halves of a membership function for a linguistic input variable. Suitably, the first and second transfer functions, respectively, have the shape of the rising or falling edge of a bell-shaped membership function.

Thus, in the fuzzification circuit if the present analog fuzzy controller, the first and the second voltage generating devices provide two sets of transfer functions, i.e. a first set of rising transfer functions and a second set of falling transfer functions. By superposing certain selectable first transfer functions, one half of a membership function may be established, whereas by superposing selectable second transfer functions, the second half of the membership function of a linguistic input variable may be construed. To this end, the outputs of predetermined first voltage generating devices are connected to a first superposing circuit and the outputs of predetermined second voltage generating devices are connected with a second superposing circuit. In the superposing circuits, a superposing is effected, in particular an adding of the output signals of the respective connected first or second voltage generating devices. In this context, it is suitable to provide for the possibility of a weighted superposing, for example, a weighted addition of the output signals. The weighting factors, i.e. the multipliers for the output signals of the first or second voltage generating, are suitably supplied externally to the superposing circuits in the form of control signals. To this avail, the superposing circuits are provided with control inputs for applying (analog) control signals. Under circuitry aspects, an adjustable weighted addition of analog signals can be realized in particular by supplying the signals to be added to individual amplifiers with adjustable amplification factors (weighting factors). The amplification factors may take values smaller and larger than 1. The signals thus weighted are then added in a summing step.

The superposing operation described above is effected separately both for certain output signals of the first voltage generating devices and for certain output signals of the second voltage generating devices. Suitably, the outputs of the two superposing circuits provided for realizing a configurable membership function for a linguistic input variable are connected with a maximum output circuit that connects the larger one of the two signals from the two superposing circuits through to their outputs. It should be noted in this context each first and each second voltage generating device provides an output signal at the output when the input signal is present at the inputs of all voltage generating devices. However, the output signals differ in magnitude due to the offset between the first and second transfer functions of the voltage generating devices. When superposing the output signals in the superposing circuits, an output signal is generated at the outputs of both superposing circuits. To describe the degree of membership of an input signal to a linguistic input variable, the larger output signal of the two superposing circuits is chosen due to the maximum output circuit.

Because of the possibility to alter the superposition of the output voltages of selected voltage generating devices from outside, it is possible to quickly change the shape of the membership functions during the operation of the fuzzy controller. Moreover, the position of a membership function may be changed posteriorly. These are two possibilities for the configurability of an analog fuzzy controller within the fuzzification circuit thereof.

It should be noted here that the superposition of a plurality of output signals of the voltage generating devices is also meant to include the case where all other output signals fed to the first or second superposing circuits are suppressed, except for the output of a first or second voltage generating device, by setting the weighting factors for the output signals to be suppressed to zero, for example. Thereby, the superposing circuit would connect an output signal at the input of the superposing circuit through to the output thereof. It is also possible to have the through-connected output signal weighted.

The first and second voltage generating devices do not necessarily have to be separate units. For example, it could be considered to realize a first and a second voltage generating device in a single differential amplifier with two inputs and two outputs. Here, one input of this differential amplifier has a reference voltage applied thereto that influences the position of the transfer functions between the other input and the two outputs of the differential amplifier. The other input of the differential amplifier is fed with the input signal.

Using differential amplifiers for realizing the first and/or second transfer functions has the advantage that, with the input signals increasing, the output voltage course has non-linear portions, which is why, as a whole, transfer functions are obtained that are rather close to one half of a bell-shaped curve. In this context, one also refers to z- or s-shaped transfer functions, wherein a s-shaped transfer function corresponds to the rising edge of a bell-shaped curve, whereas a z-shaped transfer function corresponds to the falling edge of a bell-shaped curve.

The present fuzzy controller is provided with an inference circuit in which the analog output signals of the fuzzification circuit are processed further, the processing taking into account the predetermined fuzzy rules. For each rule, a signal is generated in the inference circuit that describes the degree of membership of the result of the rule to one of a plurality of linguistic output variables. It is desirable to be able to change the linguistic output variable leaving the rule unaltered otherwise, while maintaining the membership degree. To this end, according to an advantageous embodiment of the invention, the inference circuit is provided with:

- at least one discriminator (ideally a comparator checking for equality) with two inputs and an output, for comparing a reference voltage present at one input and corresponding to a linguistic output variable to a control voltage present at the other input, wherein the result of the comparison may be outputted at the output of the discriminator, and
- at least one controllable switch having a control input connected to the output of the discriminator, a signal input to which the input signal is applied, and an output, the controllable switch connecting the input signal present at the signal input through to the output, depending on whether the control voltage is higher, or higher or equal, or smaller than the reference voltage.

With a plurality of linguistic output variables, a comparator is provided for each output variable, one respective input of each comparator being supplied with the reference voltages that correspond to the respective linguistic output variables. The same control voltage is present at the other inputs of the comparators, the voltage serving, in a way, to take influence on which comparator connects through, i.e. which linguistic output variable is addressed. The outputs of the comparators are connected with controllable switches such that the output signal of the comparator is applied to the control input of the associated switch. Due to the comparators and with the control voltage selected correspondingly, one of the comparators connects through, i.e. it generates an output signal at its output. This output signal causes the controllable switch to connect its signal input to its signal output. The output signal resulting from a fuzzy rule is present at the signal inputs of all controllable switches. Since each switch is associated with a linguistic output variable, every fuzzy rule may be changed posteriorly by the present inference circuit, and thereby the fuzzy controller may be configured, in as far as the linguistic output variable may be changed, the membership degree of the variable being determined by the magnitude of the output signal resulting from the fuzzy rule. In a way, using the inference circuit described herein, one can make optional posterior changes in the "THEN" portion of the fuzzy rules. Choosing the control voltage accordingly allows for an intentional deactivation of individual rules. This is very decisive in allowing for the configurability of the fuzzy controller.

In other words, the inference circuit according to the above embodiment of the present fuzzy controller, which by itself has an importance justifying protection even without reference to the present embodiment of the fuzzification circuit, comprises a controllable multiplex circuit having a useful signal input, a control signal input and a plurality of useful signal outputs associated to the individual linguistic output variables. The magnitude of the control voltage that may be supplied to the control signal input it is predetermined whether the input signal present at the useful signal input will be blocked or connected through, and, if it is connected through, to which output of the multiplex circuit it is connected through.

A plurality of multiplex circuits or a plurality of comparators, respectively, or a plurality of controllable switches are provided per one linguistic variable. If, which will normally be the case, the inference circuit provides, per linguistic output variable, a plurality of useful signals representing a plurality of different degrees of membership to this linguistic output variable, the useful signal corresponding to the highest membership degree will suitably be connected through to the output. Thus, suitably, the outputs of the controllable switches or the outputs of the multiplex circuits associated to the same linguistic output variables are each connected to a maximum output circuit connecting the largest of the useful signals applied thereto through to its output.

Suitably, the present fuzzy logic controller is provided with a defuzzification circuit that determines a single output value, namely the analog output signal, from the fuzzy amount of control outputs corresponding to the method of determining the center of gravity. Normally, this method includes the dividing of voltages which, as far as the circuitry is concerned, is very bulky and complex. In order to avoid this disadvantage, a variant of the invention, advantageous in that regard (s. claim 12), suggests to amplify or attenuate the voltage values that correspond to the individual linguistic output variables in accordance with the magnitude of the inference circuit output signals that describe the degrees of membership to the individual linguistic output variables, and to add the voltages resulting therefrom. An amplifier is provided for each of the voltages corresponding to a linguistic output variable, the respective voltage being applied to the input thereof. Each amplifier is adjustable in its amplification and the amplification factor of each amplifier may take values below and above 1. The output signals of the amplifiers are supplied to the inputs of a summation stage at the outputs of which the summation signal is generated which represents the analog output signal of the fuzzy logic controller. Independent from the above structure of the fuzzification circuit and that of the inference circuit, this embodiment of the invention also has an importance of its own.

Summarizing, the following is another list of the characteristics of the present analog fuzzy logic controller:

- By performing the calculation operations in the voltage range (the invention always uses voltage ranges), the properties of parallel circuits can be employed, which leads to a small chip area and a high calculation accuracy.
- Using analog circuits, the voltage signals can be processed asynchronously, leading to very short calculation times (in the range of nano seconds, for example).
- The fuzzification circuit of the present invention allows to configure the shape and the position of the membership functions for the linguistic input variables, and to quickly alter these during operation.
- Employing an analog multiplex circuit allows for an optional change of the rules, which leads to a programmable or configurable analog fuzzy logic controller. Changing the rules may be performed instantaneously, in an asynchronous manner and without requiring an additional operation mode.
- Omitting a dividing circuit from the defuzzification circuit, the operation, i.e. the division, may be performed in a very short time and on a very small chip area; the speed of the operation processing can readily be improved by several orders of magnitude compared to conventional concepts.

The following is a detailed description of an embodiment of the invention taken in conjunction with the accompanying drawings. In the Figures.

Figure 1:
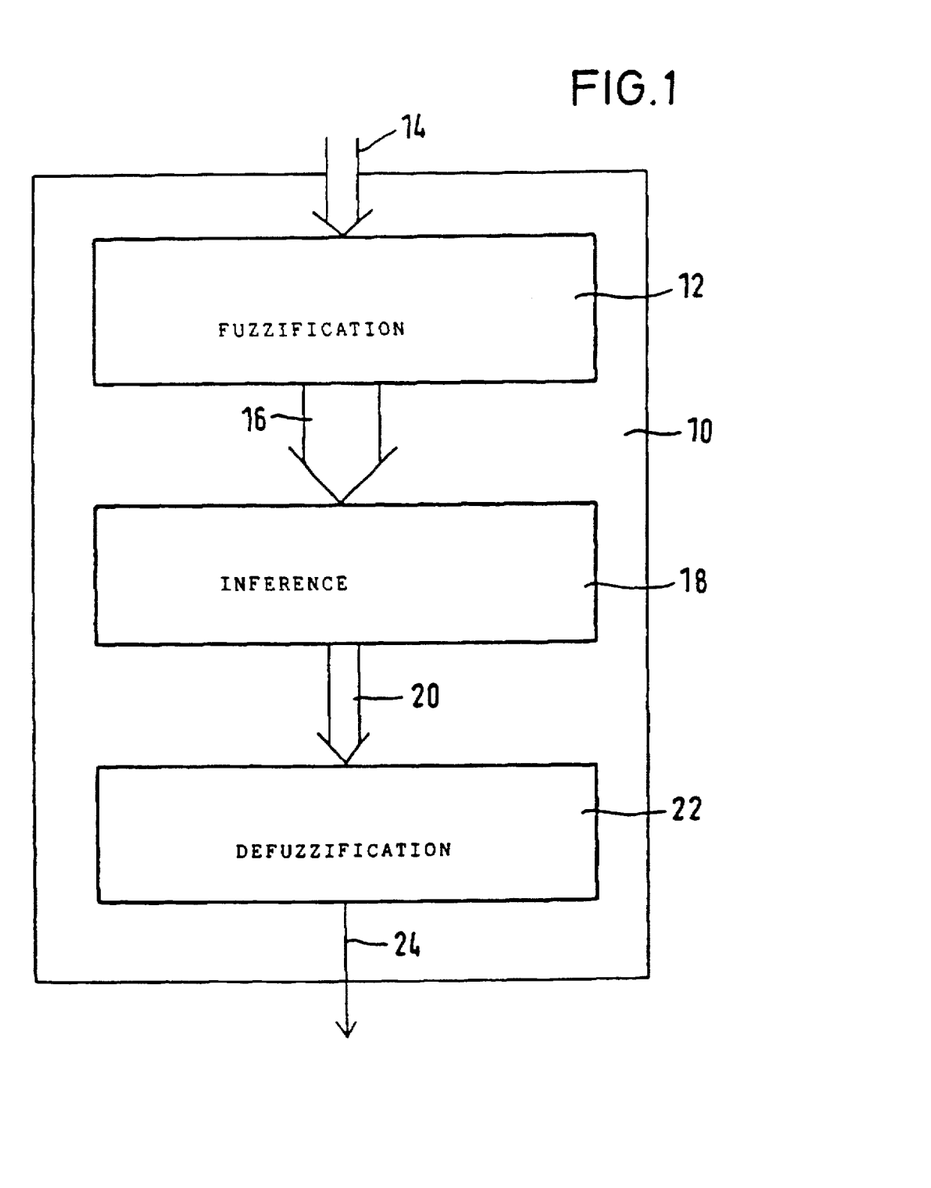
FIG. 1 is a schematic illustration of the structure of an analog fuzzy controller having the functional units of fuzzification, inference and defuzzification.

FIG. 1 is a schematic illustration of the structure of an analog fuzzy logic controller 10, using function blocks. The input stage of such a fuzzy controller 10 is formed by a fuzzification circuit 12 that defines the input of the fuzzy controller 10 and receives a plurality of input signals 14. In the fuzzification circuit 12, the degree of membership to one of a plurality of linguistic input variables is determined for each of the input signals 14. Typically, a fuzzy controller has five or seven linguistic input variables, namely the input variables Negative Large (NL), Negative Small (NS), Zero (Z), Positive Small (PS) and Positive Large (PL) or Negative Large (NL), Negative Medium (NM), Negative Small (NS), Zero (Z), Positive Small (PS), Positive Medium (PM) and Positive Large (PL).

For each linguistic input variable, a membership function is realized in circuitry in the fuzzification circuit 12. Most favorably, a membership function for a linguistic variable is a bell-shaped function. Such a function, corresponding to a Gaussian distribution, has the advantage of a comparatively great overlapping between the membership functions of neighboring linguistic variables, which in turn has the consequence that the number of linguisdtic variables and, thus, the number of fuzzy rules can be reduced, saving chip area. The fuzzification circuit 12 supplies a plurality of output signals 16, the magnitudes of which are a measure of the degrees of membership of the input signals 14 to the linguistic input variables.

The output signals 16 of the fuzzification circuit 12 are supplied to the inference circuit 18 as input signals. In this inference circuit 18, the output signals 16 of the fuzzification circuit 12 are processed further according to the fuzzy rules. The inference circuit 18, in turn, supplies output signals 20, the number of these output signals 20 being equal to the number of the linguistic output variables. The inference circuit 18 internally computes an intermediate siganle for each fuzzy rule, the magnitude of which represents the degree of membership of the fuzzy rule result to the linguistic output variable. In the same manner as a plurality of degrees of membership to different linguistic input variables are determined for an input signal 14, a plurality of degrees of membership to different linguistic output variables are determined for each intermediate signal that is the resulting signal of a fuzzy rule. For each linguistic output variable, the maximum membership degree is then determined from the set of determined membership degrees. This signal representing the maximum degree of membership to a linguistic output variable then is one of the output signals 20, which is why the total number of output signals 20 from the inference circuit 18 is equal to the number of linguistic output variables provided. Concerning the number of linguistic output variables, reference should be had to the above explanations in connection with the number of linguistic input variables.

The output signals 20 of the inference circuit 18 are supplied to a defuzzification circuit 22 as input signals. Using, for example, the center of gravity method known per se, the defuzzification circuit 22 determines a single output signal from the output signals 20. This output signal 24 is, at the same time, also the output signal of the fuzzy logic controller 10.

The anolog fuzzy controller 10 continuously operates voltage-controlled. This means that the input signals, the (internal) intermediate signals, possibly necessary control signals and the various output signals are always electric voltages.

Figure 2:
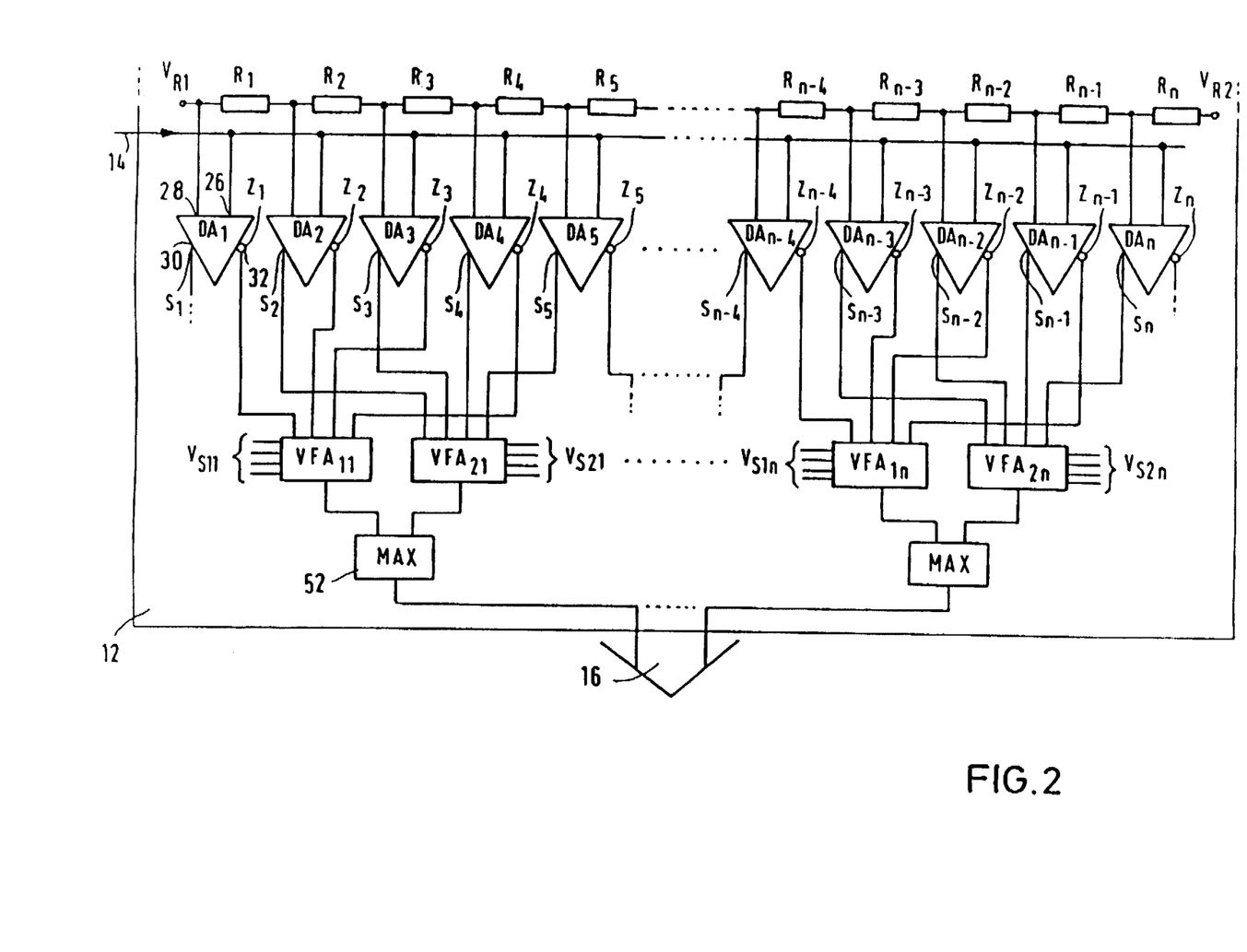
FIG. 2 is a more detailed illustration of the structure of the fuzzification circuit.

FIG. 2 is a pratial schematic representation of a realization for the fuzzification circuit 12 of FIG. 1. The circuit shown in FIG. 2 is provided in the fuzzification circuit 12 for each of the input signals 14 of the fuzzy controller 10. The circuit of FIG. 2 serves the configurability and the adjustability of the fuzzification circuit in as far as the shape and the position of the analogously generated membership functions may be altered by control voltages.

The following is a description of the structure and the function of the circuit of FIG. 2 in connection with a single input signal 14.

A plurality of differential amplifiers $DA_1$ to $DA_n$ (n being natural number) is provided for each input signal 14, the amplifiers being operational amplifiers. Each differential amplifier $DA_1$ to $DA_n$ has two inputs 26, 28, the input signal 14 being present at the inputs 26 of the differential amplifiers $DA_1$ to $DA_n$. The other inputs 28 are fed with different reference voltages, respectively. In the embodiment of FIG. 2, the generation of these different reference voltages is obtained by a voltage divider with a plurality of resistors $R_1$ to $R_n$ connected between the two potentials $V_{R1}$ and $V_{R2}$. By the voltage divider, the voltage between the two potentials $V_{R1}$ and $V_{R2}$ is divided into intermediate voltage values, i.e. the reference voltages connected to the inputs 28 of the differential amplifiers $DA_1$ to $DA_n$. The voltage difference between the two potentials $V_{R1}$ and $V_{R2}$ is selected according to the input voltage range within which the values for the input signal 14 are expected.

Further, the differential amplifiers $DA_1$ to $DA_n$ are each provided with two outputs 30, 32 that are also designated in the Figures by their output signals $S_1$ and $Z_1$ to $S_n$ and $Z_n$. The output signal courses $S_i$, $Z_i$ graphically illustrated in FIG. 3 occur at these two outputs. It is obvious that each differential amplifier $DA_1$ to $DA_n$ generates an output signal at its S output 20, which rises with the increase of the input voltage at the input 26, and generates an output signal at its Z output 32, which falls with the increase of the voltage at the input 26. The course of the otput voltages at the S and Z outputs will be described in short in connectiuon with the differential amplifier $DA_1$ with reference to FIG. 3.

Figure 3:
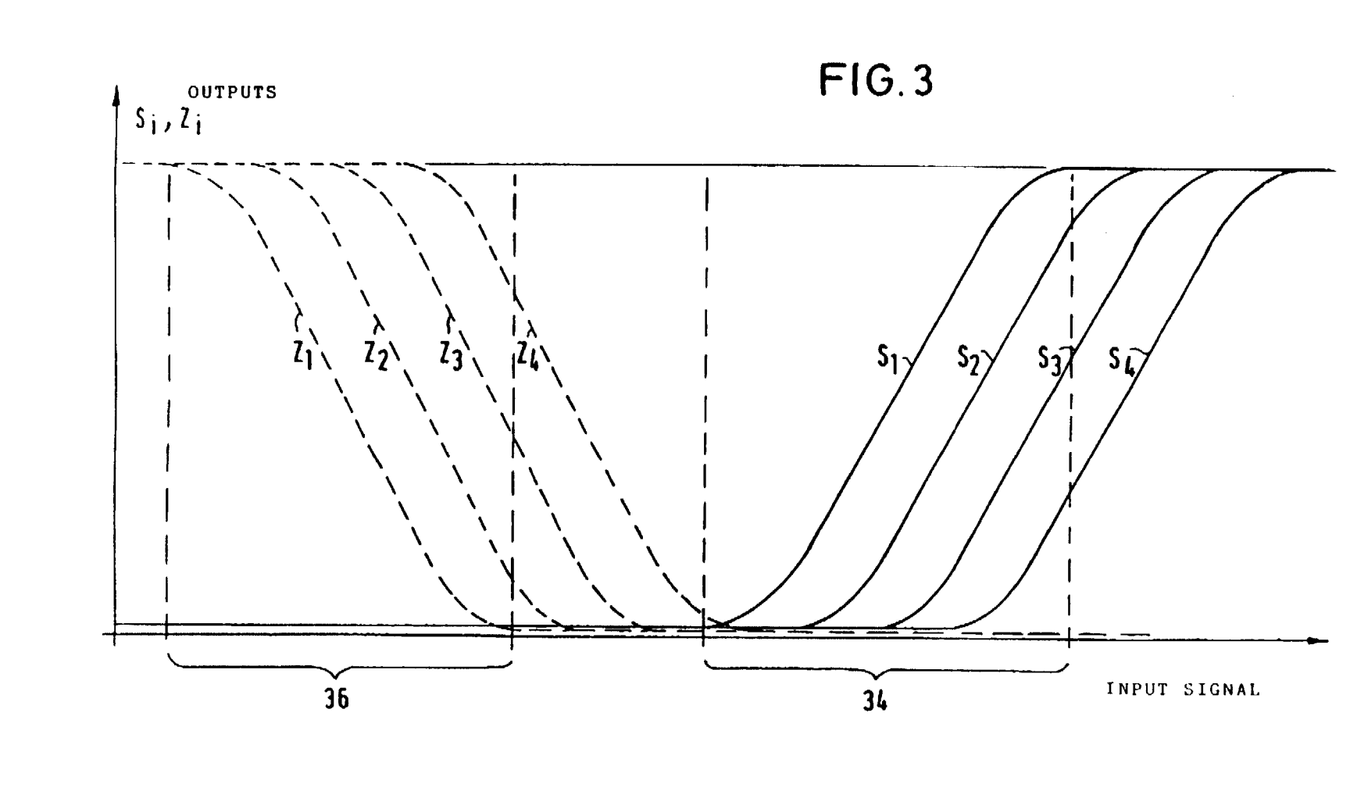
FIG. 3 is a graph of the two groups of respective mutually offset transfer functions from which the individual membership functions for the linguistic input variables are taken.

As long as the voltage at the input 26 of the differential amplifier $DA_1$ is below the voltage range designateed 34 in FIG. 3, the output voltage at the S output will remain at a constant low value. When the input voltage at the input 26 takes values within the valtage range 34, the output voltage course $S_1$ shown in FIG. 3 is obtained, which substantially corresponds to the rising flank of a bell-shaped function. With input voltage values above the voltage range 34, the S output remains on a constant maximum output voltage value. The position of the voltage range 34 is determined by the magnitude of the reference voltage present at the input 28 of the differential amplifier $DA_1$.

The voltage course at the Z output 32 of the differential amplifier $DA_1$ is substantially complementary to the output voltage course at the S output. As long as the input voltage at the input 26 is smaller than predetermined by a voltage range 36. The Z output will remain on the constant maximum output voltage, which is identical to the maximum output voltage at the S output. With input voltage values at the input 26 that are within the voltage range 36, the Z output will show the course illustrated at $Z_1$ in FIG. 3, which substantially resembles the falling flank of a bell-shaped function. When the input voltage exceeds the voltage range 36, the Z output will remain on the constant low voltage level which is equal to the minimum output voltage level of the S output. The position of the voltage range 36 is connected to the magnitude of the reference voltage peresent at the input 28 of the corresponding differential amplifier. In other words, the differential amplifiers $DA_1$ are a kind of window discriminators which, for input voltage values in the range between the lower limit of the voltage range 36 and the upper limit of the voltage range 34, provide an output signal at ione of theitr two S or Z outputs that is different from the output signals delivered for input voltages outside the voltage range mentioned before. The overall transfer function of the differential amplifiers $DA_1$ to $DA_n$ can be seen as an inverted trapezoidal shape, the position of this trapezoidal shape within the allowable voltage range for the input signal being determined by the selection of the reference voltage applied to the respective differential amplifier. The distance of the trapezoidal transfer functions is, thus, determined in the example of FIG. 2 by the value of the resistors $R_1$ to $R_n$ of the voltage divider; in particular, these resistors should be chosen equal, whereby the set of graphs shown in FIG. 3 for the differential amplifiers $DA_1$ to $DA_n$ is obtained.

The overall transfer behavior of a differential amplifier $DA_1$ to $DA_n$ can be described by a first and a second transfer function referred to in FIG. 3 as $S_1$ and $Z_1$ to $S_4$ and $Z_4$ for the first differential amplifiers $DA_1$ to $DA_4$. Here, these first and second transfer functions (in FIG. 3, the first transfer functions are shown in full lines, whereas the second transfer functions are shown in broken lines) describe the transfer beghavior between the input 26 for the useful signal or input signal 14 and the output 30, as well as between the input 26 and the output 32 of the differential amplifiers $DA_1$ to $DA_n$. In other words, each differential amplifier $DA_1$ to $DA_n$, in a way, represents two voltage generating circuits that are characterized by the transfer functions of FIG. 3.

The outputs 30, 32 of the differential amplifiers $DA_1$ to $DA_n$ are connected with first and second voltage superposing circuits $VFA_{11}$ and $VFA_{21}$, to $VFA_{1n}$ and $VFA_{2n}$. The ouputs of the circuits $VFA_{11}$ to $VFA_{1n}$ are connected to the Z outputs 32 of certain, respectively different differential amplifiers $DA_1$ to $DA_n$ whereas the inputs of the circuits $VFA_{21}$ to $VFA_{2n}$ are connected to the S outputs of certain differential amplifiers $DA_1$ to $DA_n$. In the superposing circuit VFA, an addition of the output voltages is performed that, with an input signal 14 applied, are present at the Z or S outputs of those differential amplifiers $DA_1$ to $DA_n$ that are connected with the respective super-posing circuit VFA. For each membership function to be realized, first and second superposing circuits $VFA_{11}$, $VFA_{21}$ to $VFA_{1n}$, $VFA_{2n}$, are provided. Here, each first and second superposing circuit functions to realize the course of the two flanks (rising or falling flank) of the desired membership function.

Figure 4:
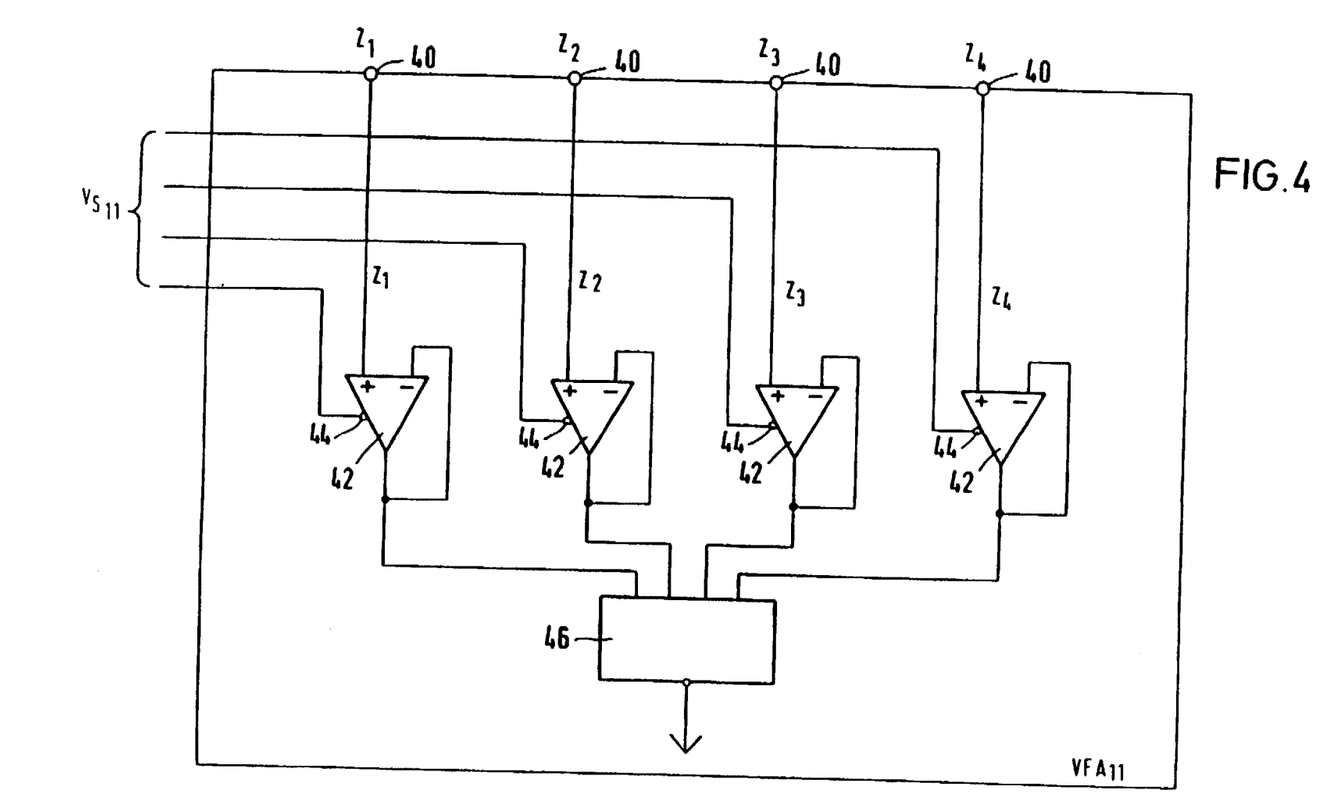
FIG. 4 shows a detail of the structure of the circuit blocks that are connected with the outputs of the differential amplifiers, as shown in FIG. 2.
Figure 5:
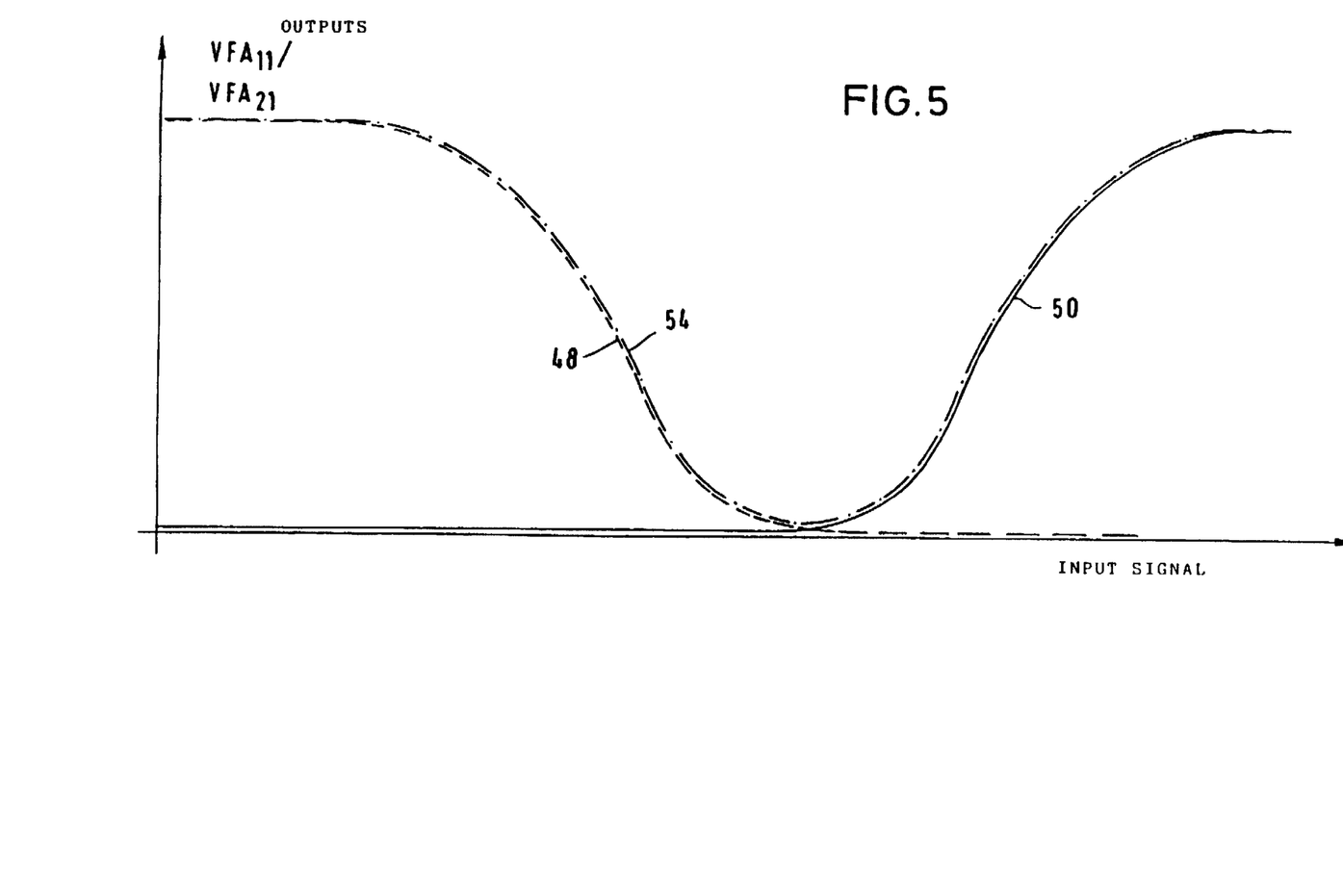
FIG. 5 is a graph for a membership function generated from a superposition of the transfer function of FIG. 3 using the fuzzification circuit of FIGS. 2 and 4.

FIG. 4 is a detailed illustration of the structure of the superposing circuit $VFA_{11}$. The inputs 40 of the superposing circuit $VFA_{11}$ are connected to the outputs 32 of the differential amplifiers $DA_1$ to $DA_4$. Each input 40 is internally connected to an amplifier 42 having an adjustable amplification. To this avail, each amplifier 42 has a control input 44, to which a control voltage can be applied. The control voltages are designated $V_s$ in FIG. 4. The amplification factor of each amplifier 42 is adjusted individually by these control voltages. As a consequence, the outpu voltages of the connected differential amplifiers are included weighted in the superposition. The superposition itself is an addition of the output voltages of the amplifiers 42 added in a summation stage 46. The output signal of the summation stage 46 is the summation signal. In the example of FIG. 4, the falling flank of a membership function having an inverted bell shapeis simulated by a weighted addition of four Z outputs of the differential amplifiers $DA_1$ to $DA_n$ (s. FIG. 5). Accordingly, the superposing circuit $VFA_{21}$ of FIG. 2 simulates the rising flank of a superposing function generated by the four S outputs of the differential amplifiers $DA_1$ to $DA_n$. Depending on the voltage value of the input signal 14, the voltage course designated 48 in FIG. 5 will occur at the output of the summation stage of the first superposing circuit $VFA_{11}$. In contrast thereto, the signal course illustrated at 50 in FIG. 5 will occur at the output of the second superposing circuit $VFA_{21}$, in dependence on the magnitude of the input signal 14. The two outputs of the first and second superposing circuits $VFA_{11}$ and $VFA_{21}$ are supplied as input signals to a filter circuit in the shape of a maximum output circuit 52 which connects the larger one of the two input signals through to its (single) output. Thus, depending on the magnitude of the input signal 14, the output signal course of the maximum output circuit 52 is the bell-shaped cpourse 54 represented by dash-dot lines in FIG. 5.

In the manner described, a membership function is established for each linguistic input variable. For example, five linguistic input variables would require five first superposing circuits $VFA_{11}$ and $VFA_{15}$, five second superposing circuits $VFA_{21}$ and $VFA_{25}$ and five maximum output circuits 52. For each of the five first and second superposing circuits, a respective set of control voltages $V_{S11}$, $V_{S21}$ to $V_{S1n}$ and $V_{S2n}$ is required. For each input signal 14, the output signals of the maximum output circuits 52, five in this case, form the output signals 16 to be supplied to the inference circuit 18. The number of output signals 16 is equal to the product of the number of input signals 14 and the number of linguistic input variables.

The fuzzification circuit 12 described before makes it possible to configure the fuzzy controller with a view to the shape and the position of its membership functions. This is done in a rather simple manner by external control voltages that may be applied to the fuzzification circuit 12. Moreover, the fuzzification circuit 12 provides bell-shaped membership functions which eventually leads to a reduction in the minimum number of linguistic input variables necessary for a reliable control, which, in turn, saves chip area. For reasons of circuitry, inverted bell-shaped functions are established as membership functions. Such inverted functions facilitate the further processing of the voltage signals. Basically, however, it is of no importance whether the bell-shaped functions are inverted or not. If they are not inverted, the maximum output circuits 52 must be replaced by minimum output circuits.

In the inference circuit 18, the output signals 16 of the fuzzification circuit 12 are processed further according to the fuzzy rules set up. For each fuzzy rule, the inference circuit 18 internally generates signals describing the degrees of membership of the result of the fuzzy rule to the linguistic output variables. When designing a fuzzy controller, it is often advantageous, however, if the assignment of a degree of membership of a control output to a linguistic output variable can be altered posteriorly. This possibility is even more advantageous in that it allows for providing general fuzzy controller that can be specially adapted to the respective use. At its output, the inference circuit 18 is provided with a plurality of analog multiplex circuits 56, there being provided one such multiplex circuit 56 for each control output. Each multiplex circuit 56 has an input 58 at which the output signal of a fuzzy rule or, more specifically, the signal representing the "IF" portion of a fuzzy rule is present. Further, the multiplex circuit 56 has a second input 60 to which a control voltage may be applied. It is the purpose of the multiplex circuit 56 to connect the signal present at its input 58 through to one of a plurality of outputs 62. The multiplex circuit 56 has as many outputs 62 as there are linguistic output variables. Thus, each output 62 is assigned to a linguistic output variable.

Figure 6:
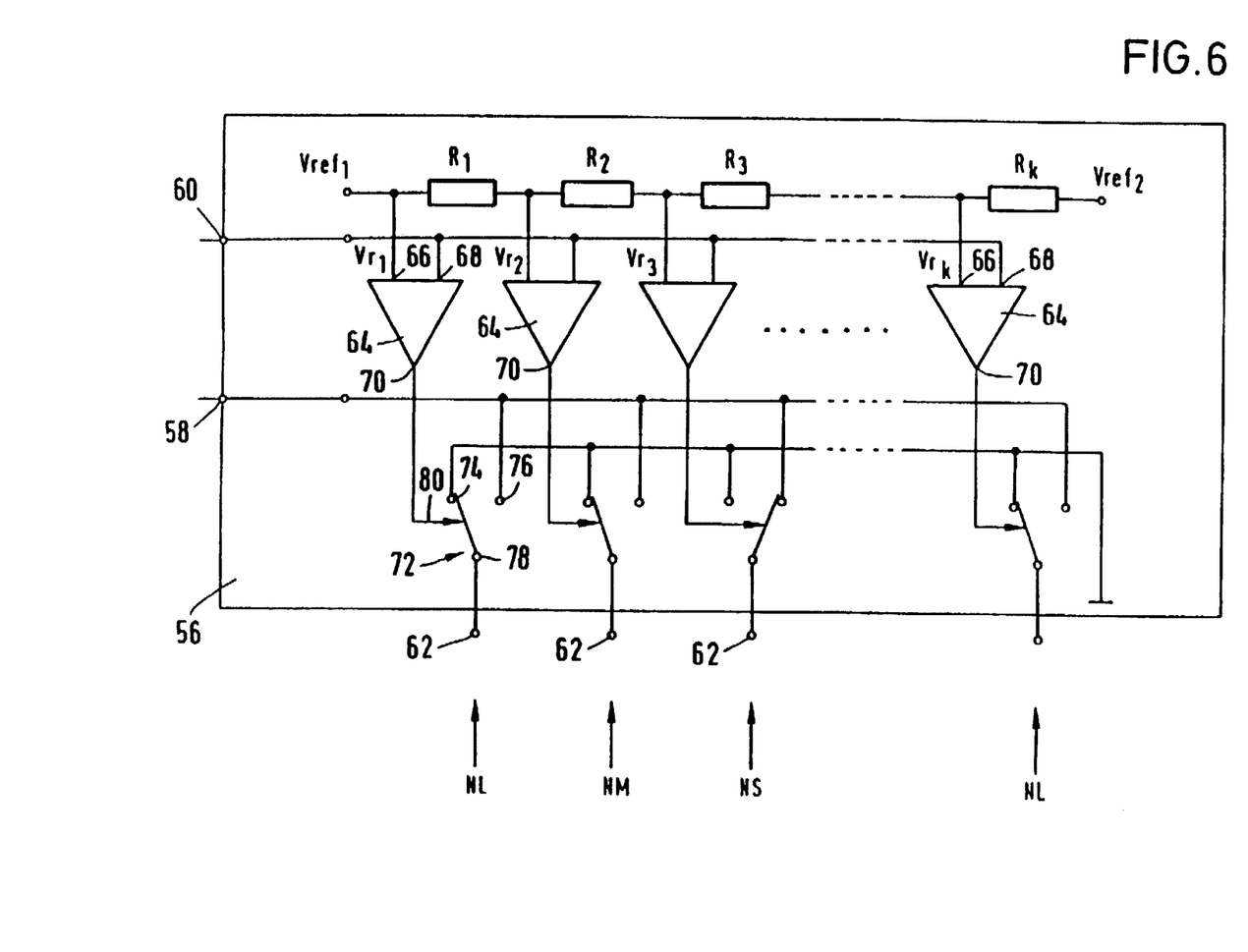
FIG. 6 illustrates the structure of a multiplex circuit provided at the output of the inference circuit of the fuzzy logic controller for each output signal of a fuzzy rule.

As shown in FIG. 6, the multiplex circuit 56 is provided with a plurality of discriminators 64, each having two inputs 66, 68. The inputs 68 are all connected with the input 60 of the multiplex circuit 56, whereas the other inputs of the discriminators 64 are supplied with reference voltages of different magnitudes, which are generated by voltage dividing using a voltage divider comprising the resistors $R_1$ to $R_k$. The voltage divider is connected between two reference potentials $V_{ref1}$ and $V_{ref2}$. Thus, each discriminator 64 has a sensitive input voltage range, all of these input voltage ranges being different from each other. If the control voltage supplied to the discriminators via their inputs 68 is within one of these sensitive input voltage ranges, the associated discriminator 64 will react and generates an output signal at the output 70. This output signal is passed to a controllable switch 72. One controllable switch 72 is provided per one discriminator 64. Each controllable switch 72 has two inputs 74, 76, an output 78 and a control input 80 that is connected to the output of the associated discriminator 64. The inputs 76 of all controllable switches 72 are connected to the input 58 of the multiplex circuit 56 at which the output signal of the fuzzy rule is present. The other inputs 74 of the controllable switches 72 are connected to ground potential. In the initial position of the switches 72, the inputs 74 connected to ground are connected to the outputs 78 of the switches 72. When the output signal generated by a reacting associated discriminator 64 is supplied to the control input 80 of a controllable switch 72, the controllable switch 72 switches, which results in its second input 76 now being connected to the output 78. Thus, selecting the magnitude of the control voltage at the input 60 of the multiplex circuit 56 influences which output 62 of the multiplex circuit 56 the signal present at the input 58 thereof is connected through. Thereby, the "THEN" portion of every fuzzy rule may be altered posteriorly by applying an external voltage, i.e. the control voltage, to the input 60 of the multiplex circuit 56.

Figure 7:
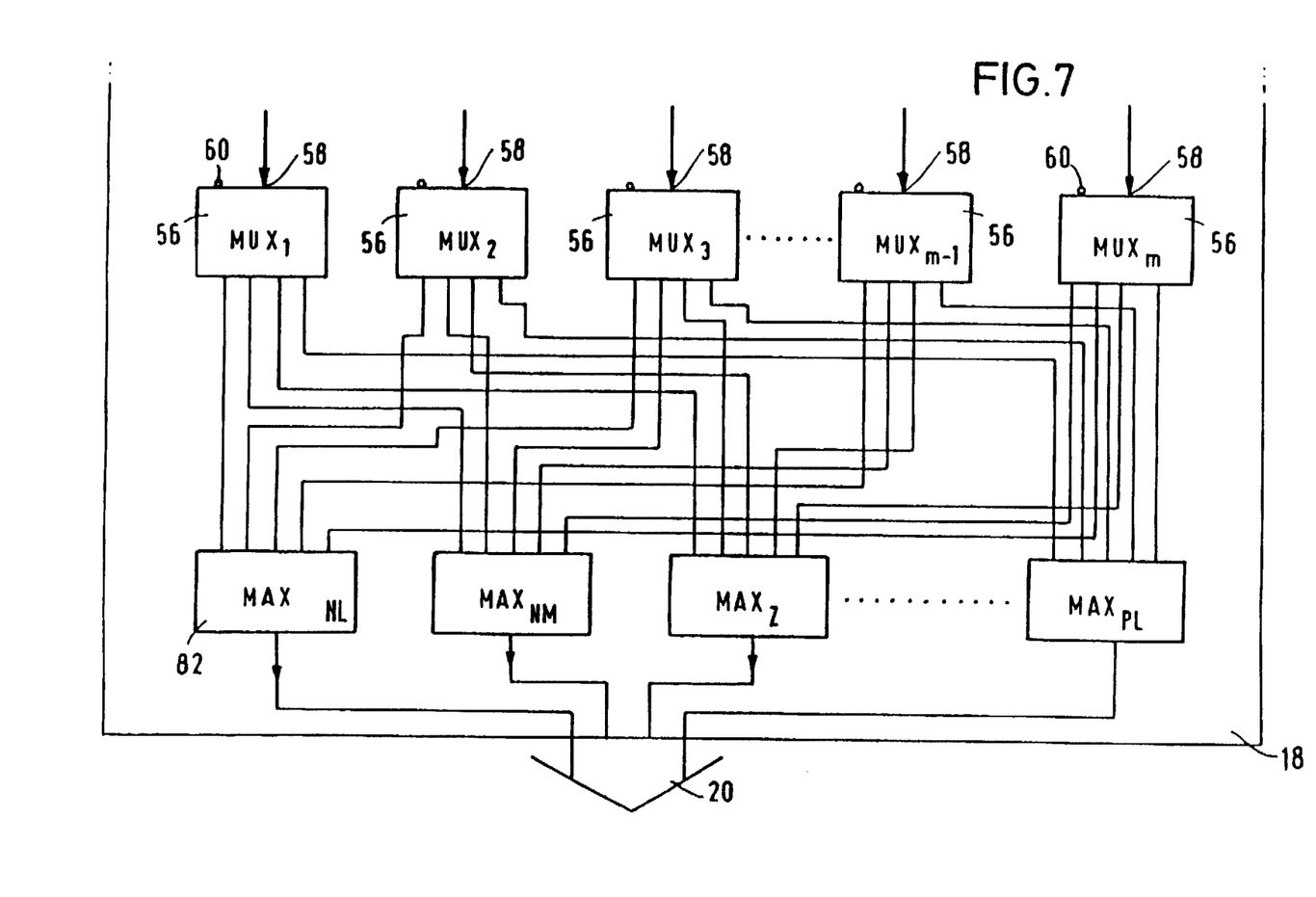
FIG. 7 shows the maximum output circuits provided downstream of the multiplex circuits, for determining the maximum degree of membership of the output signals of the fuzzy rules to the individual linguistic output variables.

Thus, a multiplex circuit 56 is provided for each fuzzy rule. It is decisive for the further processing and in particular for the defuzzification, which fuzzy rule or which multiplex circuit supplies the maximum membership degree for the individual linguistic output variables. Therefore, as shown in FIG. 7, the outputs of all multiplex circuits 56 are connected to maximum output circuits 82, there being provided as many maximum output circuits 82, as there are linguistic output variables. The outputs 62 of the multiplex circuits 56 associated to the individual output variables are connected to the maximum output circuit 82 associated to this linguistic output variable (s. FIG. 7). The maximum output circuits 82 each supply a single output value representing the maximum degree of membership of a control output to the respective linguistic output variable.

The output variables of the maximum output circuits 82 are the output signals 20 of the inference circuit 18 that are subsequently fed to the defuzzification circuit 22 as input signals.

Figure 8:
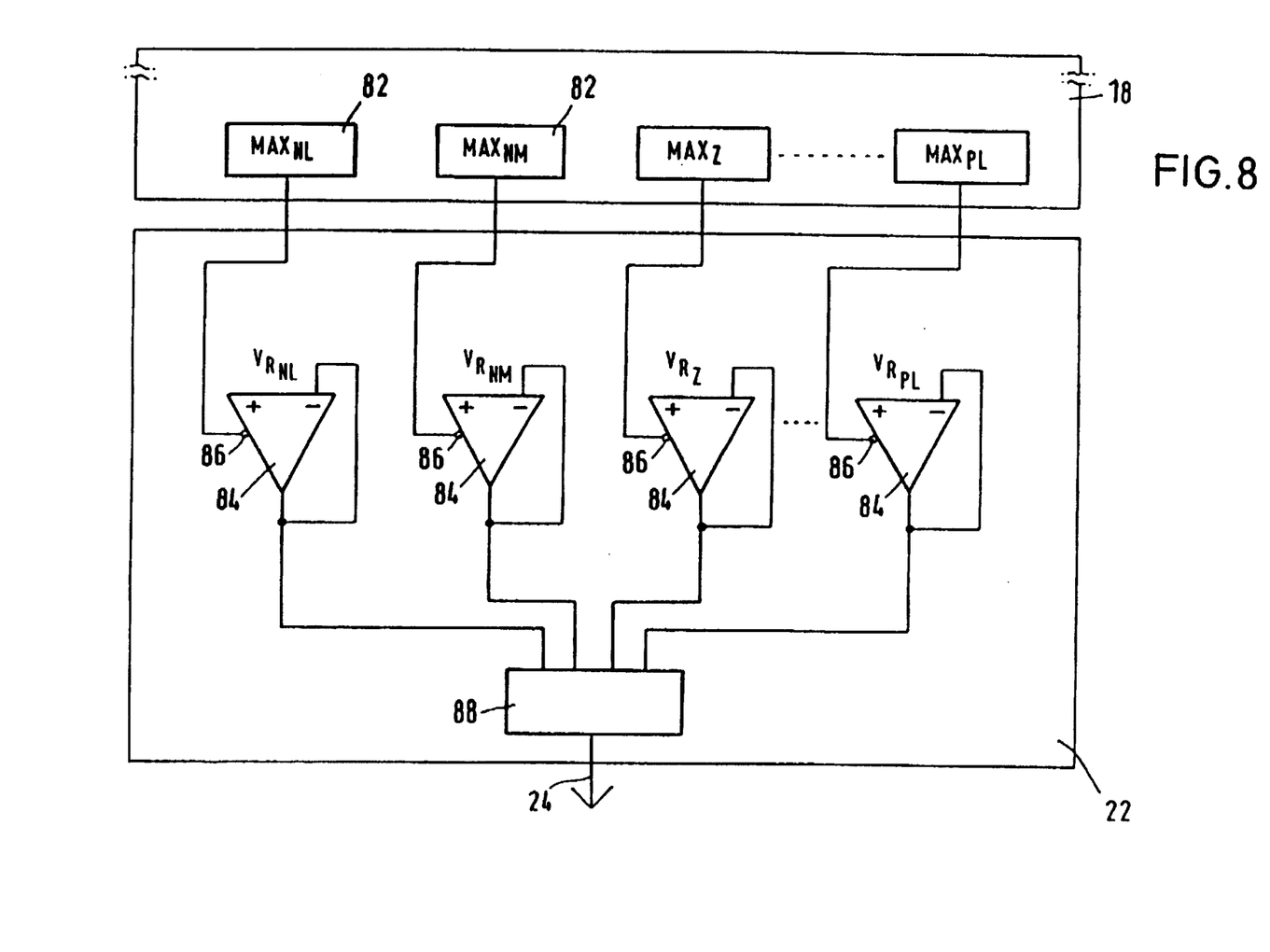
FIG. 8 is a detail of the defuzzification circuit of the fuzzy logic controller for realizing, in terms of circuitry, the center of gravity method for determining the output signal of the fuzzy logic controller.

FIG. 8 is a block diagram of the defuzzification circuit 22. For each linguistic output variable, the defuzzification circuit 22 is provided with an amplifier 84 with a respective adjustable amplification factor, the amplification control inputs 86 thereof being fed with the output signals of the inference circuit 18. At the input of each amplifier 84, there is a reference voltage present. All of these reference voltages are of different magnitudes and are voltage values representing the linguistic output variables. The magnitude of the output signals 20 supplied from the inference circuit 18 to the amplification control inputs 86 determines the amplification factor of the amplifier 84 concerned, which factor may take amplification values larger or smaller than 1. The outputs of the amplifiers 84 are connected to a summation stage 88 in which a summation of the supplied output signals is performed. The summation signal outputted by this summation stage 88 is the output signal 24 of the fuzzy controller 10.

The defuzzification circuit 22 of FIG. 8 performs the so-called center of gravity method for determining the output signal 24, without the necessity of a dividing operation, which is required by the theory of this method. This reduces the chip area required for realizing the fuzzy controller. Moreover, the signal processing speed is increased substantially (by several orders of magnitude up to $10^6$ and more).

We claim:

1. An analog fuzzy logic controller comprising:

a fuzzification circuit for converting at least one analog input signal to at least one analog output signal describing the degree of membership of the input signal to at least one linguistic input variable and representing a fuzzy value, an inference circuit for processing the at least one analog output signal according to predetermined fuzzy rules and for outputting at least one analog output signal representing the degree of membership of the processed output signal of the fuzzification circuit to at least one linguistic output variable, and a defuzzification circuit for converting the at least one output signal of the inference circuit to at least one overall output signal that corresponds to the degree of membership of the output signal of the inference circuit to the at least one linguistic output variable, characterized in that the fuzzification circuit is provided with a plurality of first voltage generating devices with mutually offset first transfer functions (Z; S), wherein the input signal may be applied to the inputs of the first voltage generating devices and wherein, within different voltage value ranges of the input signal the first voltage generating devices generate a first output signal at their outputs that decreases with the increase of the input signal, a plurality of second voltage generating devices with mutually offset second transfer functions (S; Z), wherein the input signals may be applied to the inputs of the second voltage generating devices and wherein, within different voltage value ranges of the input signal, the second voltage generating devices generate a second output signal at their outputs that increases with the increase of the input signal, a first superposing circuit (VFA) for superposing the output signals of a plurality of selectable first voltage generating devices or for connecting through the output signal of a selectable first voltage generating device, the inputs or the input of the first superposing circuit (VFA) being connected to the outputs of the selected first voltage generating devices or the output of the selected first voltage generating device, and wherein the superposing signal of the output signals of the selected first voltage generating devices or of the output signal of the selected first voltage generating device is present at the output of the first superposing circuit (VFA), a second superposing circuit (VFA) for superposing the output signals of a plurality of selectable second voltage generating devices or for connecting through the output signal of a selectable second voltage generating device, the inputs or the input of the second superposing circuit (VFA) being connected to the outputs of the selected second voltage generating devices or the output of the selected second voltage generating device, and wherein the superposing signal of the output signals of the selected second voltage generating devices or of the output signal of the selected second voltage generating device is present at the output of the second superposing circuit (VFA), and a filter circuit connected with both outputs of the first and second superposing circuits (VFA), which are associated with a linguistic variable, for connecting through the greater or the smaller one of the output signals of the two superposing circuits, the output signals of the filter circuit corresponding to the fuzzy value for the input signal present at the first and second voltage generating devices.

2. The analog fuzzy logic controller of claim 1, characterized in that said first and second superposing circuits (VFA) each have control inputs for applying control signals ($V_s$), and that said first and second superposing circuits (VFA) perform a weighted superposing of the output signals of the respective selected first or second voltage generating devices or connect the weighted output signal of the respective selected first or second voltage generating devices through, the weighting factors being determined by the control signals ($V_s$).

3. The analog fuzzy logic controller of claim 1 or 2, characterized in that said first and second superposing circuits (VFA) each comprise a summation output stage for summing the output signals of the selected first or second voltage generating devices or for connecting the output signal of the selected first or second voltage generating devices through.

4. The analog fuzzy logic controller of claim 2, as far the latter refers to claim 2, characterized in that said first and second superposing circuits (VFA) have amplifiers provided at their inputs, the amplification factors of the amplifiers being adjustable by said control signals ($V_s$).

5. The analog fuzzy logic controller, claim 1, characterized in that said first transfer functions (Z) are substantially Z-shaped in the different voltage value ranges of the input signal that correspond to the first voltage generating devices and that said second transfer functions (S) are substantially S-shaped in the different voltage value ranges of the input signal that correspond to the second voltage generating devices.

6. The analog fuzzy controller of claim 1, characterized in that a first and a second voltage generating device are realized, respectively, by a differential amplifier (DA) with two inputs and two outputs, wherein a reference voltage may be applied to one input and the input signal may be applied to the other input, the transfer function between the input, to which the input signal may be applied, and the one output being Z-shaped and the transfer function between the input, to which the input signal may be applied, and the other output is S-shaped.

7. The analog fuzzy logic controller of claim 1, characterized in that for generating a plurality of output signals describing the degree of membership of an input signal to a plurality of linguistic input variables, a first and a second superposing circuit (VFA) are provided per linguistic input variable, the inputs of the circuits being respectively connectable with the outputs of different first and second voltage generating devices, and that a filter circuit is provided, respectively, which is connected to the outputs of the two superposing circuits (VFA).

8. The analog fuzzy controller of claim 1, characterized in that the inference circuit comprises at least one controllable multiplex circuit having a useful signal input, a control signal output an a plurality of useful signal outputs associated with the linguistic output variables, the control voltage that may be applied to the control signal input allowing to predetermine whether and if, and if so, to which useful signal output of the multiplex circuit an input signal that may be applied to the useful signal input is connected through.

9. The analog fuzzy logic controller of claim 8, characterized in that the multiplex circuit is provided with at least one discriminator having two inputs and an output, for comparing a reference voltage present at one input and corresponding to a linguistic output variable to a control voltage present at the other input, wherein the result of the comparison may be outputted at the output, and at least one controllable switch having a control input connected to the output of the discriminator, a signal input to which the input signal is applied, and an output, the controllable switch connecting the input signal present at the signal input through to the output, depending on whether the control voltage is higher, or higher or equal, or smaller than the reference voltage.

10. The analog fuzzy logic controller of claim 9, characterized in that, for a plurality of linguistic output variables, a plurality of discriminators and a plurality of controllable switches are provided for each of these linguistic output variable.

11. The analog fuzzy logic controller of claim 8, characterized in that for a plurality of input signals for a linguistic output variable, a discriminator and a controllable switch are provided for each of these input signals, and that the outputs of all controllable switches are connected to a filter circuit having an output to which the largest of the output signals outputted from the controllable switches may be connected through.

12. The analog fuzzy logic controller of claim 1, characterized in that the defuzzification circuit is provided with at least one amplifier with a controllable amplification factor for amplifying a reference voltage corresponding to a linguistic output variable, an amplifier being provided for each reference voltage that corresponds to a linguistic output variable and the magnitude of the amplification factor being adjustable by that output signal of the inference circuit that describes the degree of membership of the output signals from the fuzzification circuit, processed according to the fuzzy rules, to the respective linguistic output variables, and a summation output stage for generating the overall output signal as the sum of the output signals of the amplifiers.

* * * * *